United States Patent [19]

Schroeder

[11] Patent Number: 5,561,749
[45] Date of Patent: Oct. 1, 1996

[54] MODELING OF SURFACES EMPLOYING POLYGON STRIPS

[75] Inventor: William J. Schroeder, Schenectady, N.Y.

[73] Assignee: General Electric Company, Schenectady, N.Y.

[21] Appl. No.: 348,407

[22] Filed: Dec. 2, 1994

[51] Int. Cl.[6] ............................................. G06T 17/00
[52] U.S. Cl. ...................................... 395/120; 395/123
[58] Field of Search ................................ 395/120, 123, 395/119, 124, 133, 141, 161

[56] References Cited

U.S. PATENT DOCUMENTS

| | | | |
|---|---|---|---|
| 4,616,217 | 10/1986 | Nesbitt et al. | 395/121 |
| 4,710,876 | 12/1987 | Cline et al. | 364/414 |
| 4,860,220 | 8/1989 | Tanaka et al. | 395/120 |
| 4,930,092 | 5/1990 | Reilly | 395/123 |
| 5,113,490 | 5/1992 | Winget | 395/119 |
| 5,278,983 | 1/1994 | Kawabe et al. | 395/120 |
| 5,448,686 | 9/1995 | Borrel et al. | 395/120 |

*Primary Examiner*—Almis R. Jankus
*Attorney, Agent, or Firm*—Lawrence P. Zale; Marvin Synder

[57] ABSTRACT

A graphic workstation converts a polygonal model generated with computer aided design (CAD) software or volumetric data into a more compact polygon strip list having multiple strip sublists. The strip list, in addition to being more compactly stored, is displayed much more rapidly than conventional polygonal models since much of the redundant redrawing is eliminated. Shared point of adjacent polygons are eliminated. The strip list consists of a number of strip lists, each list having vertices of a first, or initial, polygon and subsequent vertices defining remaining portions of polygons to be 'built onto' the polygon strip in the strip direction. Since this method of model storage and display is much more efficient, less powerful graphic workstation could be implemented in place of more powerful graphics workstations; or alternatively, existing graphics workstation would become faster and have more free memory available for other functions.

6 Claims, 2 Drawing Sheets

5,561,749

MODELING OF SURFACES EMPLOYING POLYGON STRIPS

BACKGROUND OF THE INVENTION

1. Field of the Invention

The present invention relates to display of computer generated models and more specifically to rapid display of computer generated surfaces.

2. Description of Related Art

Computer graphic simulation methods typically create a computer generated model of objects or structures desired to be examined. These models are comprised of a number of surfaces. The surfaces can be approximated by a number of interconnected polygons, most probably triangles. These may be referred to as 'polygonal models'. The polygonal models may be generated by conventional CAD/CAM methods or from volume data as described in the "marching cubes" method of U.S. Pat. 4,710,876 "System and Method for the Display of Surface Structures Contained Within the Interior Region of a Solid Body" by Harvey E. Cline and William E. Lorensen issued Dec. 1, 1987, assigned to the present assignee and hereby incorporated by reference. The volume data obtained from imaging systems such as Magnetic Resonant Imaging (MRI), Computed Axial Tomography (CAT), Positron Emission Tomography (PET), etc. is converted into lists of polygons for display on a graphics workstation.

Each of these triangles (identified by its vertices and possibly a vector normal to the surface of the triangle) are stored to be manipulated and displayed. These models may be manipulated by rotating them and displaying portions of the models. Transformations of coordinates are used to rotate the model with a 4×4 matrix equation. After transformation, the transformed model is displayed. Since all vertices of each polygon must be displayed in order to display the model, a great deal of processing power is required to rapidly manipulate and display each model.

Currently there is a need for a more efficient method of storing and displaying polygonal models.

OBJECTS OF THE INVENTION

An object of the present invention is to provide a display system having improved performance over conventional display systems.

Another object of the present invention is to provide a method of efficient display of computer generated models on less powerful computer graphics systems.

Another object of the present invention is to provide a method of storing computer generated surfaces definition in a smaller memory space.

SUMMARY OF THE INVENTION

A method of generating a polygon strip list which describes a computer model is presented. The polygon strip list having a plurality of sublists each over different locations, may be stored more compactly, and also displayed more rapidly that conventional polygonal models. The method may begin with a polygonal computer model being a set of polygons each with several vertices, or start with a data set which is converted into a polygonal model. An initial polygon of the polygonal model is then selected. The vertices of the initial polygon are stored in a strip list. A strip direction is selected and used to generate the polygon strip list.

Another polygon in the strip direction is selected that shares at least two of the vertices the initial polygon. The vertices of the polygon, except for those already stored in the strip list, are stored. Since two vertices are shared, they have already been stored. In the case of the polygons being triangles, only one additional vertex will be stored in contrast to polygonal models which store all three redundantly.

This process is repeated for other polygons in the strip direction until there are no more adjacent polygons which have not already been stored. In this case, then another strip direction and initial polygon are selected until, the portion of the model, desired to be analyzed is stored.

Display is accomplished in the reverse of storage. An initial polygon is read from the strip list along with a strip direction. Vertices are then read and drawn in the strip list until the end of the strip sublist. This is repeated for additional sublists until the desired model portion is drawn.

There is considerable time/computation savings in redrawing the model since redundant points are not redrawn. This method exhibits both advantages of minimizing storage while maximizing display speed, which typically are tradeoffs.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
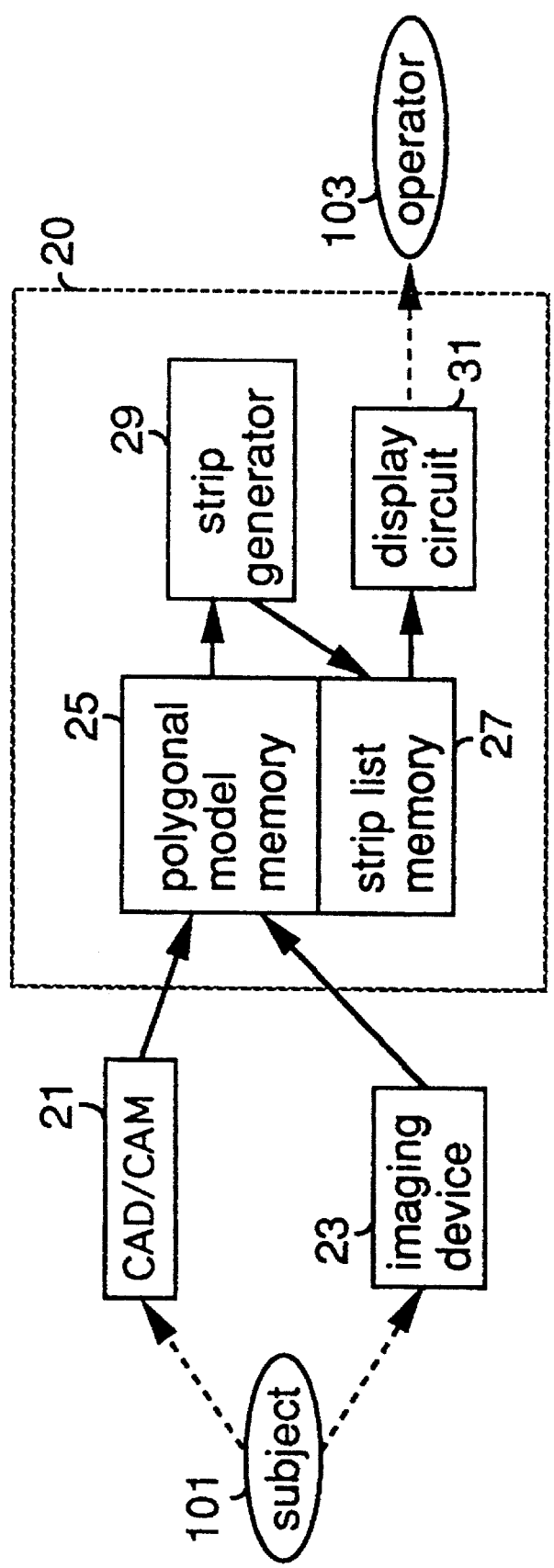
FIG. 1 is a simplified block diagram of the system of the present invention.

Reference is made to FIG. 1 where a polygonal model is generated from a subject 101 either from a computer aided design (CAD) workstation 21 or from an imaging device 23 which acquires volumetric dam from subject 101 and converts it to a polygonal model. The polygonal model is stored in a polygon model memory 25 of a workstation 20. Polygon model memory 25 may be any data storage device either, temporary or permanent, volatile or non-volatile, such as digital memory or disk storage.

A strip generator 29 reads the polygonal model from polygon model memory 25 and converts the polygonal model to polygonal strip list comprised at least one strip sublist, and stores the strip list in a strip list memory 27. Strip list memory 27 has the same properties as polygonal model memory 25 and may share the same device. Each polygonal strip defines a surface in a compact form which also allows very rapid display of the surface.

A display circuit 31 reads the sublists from strip list memory 27 and recreates portions of the original computer model and displays an :image of the model to an operator 103 much more rapidly than a conventional polygonal model.

Figure 2:
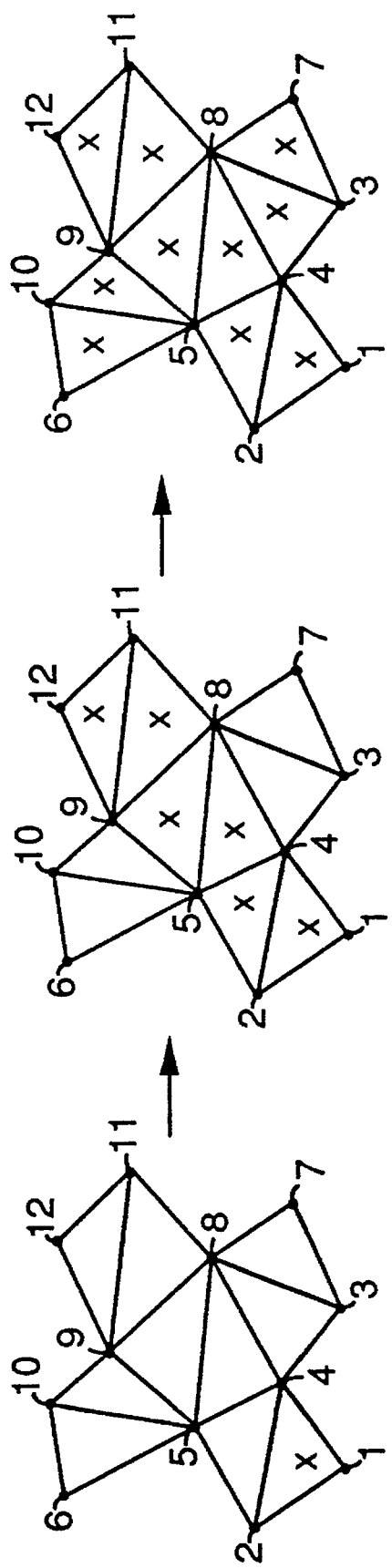
FIG. 2 is an illustration of how polygons are transformed into triangle strips according to a preferred embodiment of the present invention.

The functioning of strip generator 29 in generating a strip list is best described in conjunction with FIG. 2. Strip generator 29 selects a first polygon (1,2,4) identified by its vertices, from the polygon model memory (25 of FIG. 1) as a starting point. Vertices (1,2,4) defining this polygon are entered into the strip list memory 27. A strip direction is then selected in which to continue convert polygons.

A next polygon (2,4,5) in the strip direction which shares at least two vertices of the previously selected polygon (1,2,4) is selected. The vertices, except for those shared by the previous polygon, and hence already entered into the strip list, are added to the strip list, in this case being only vertex 5.

Continuing in the strip direction, another polygon (4,5,8) is selected which shares at least two of the vertices of the previously selected polygon (2,4,5), is selected. Again, all vertices which are not already in the strip list are entered into the strip list, being only vertex 8.

Strip generator continues this conversion process for each selected polygon in the strip direction until all adjacent polygons in this direction have been entered into strip list memory 27 of FIG. 1. At this point, a first sublist has been finished (1,2,4,5,8,9,11,12).

Other sublists may also be created from remaining polygons. A new initial polygon is selected and another strip direction is selected. Polygon vertices are added to a new sublist only if not incorporated in previous sublists. This conversion process results in the creation of a plurality of strips in the strip list, for sublists (6,5,10,9) and (4,3,8,7).

Each sublist omits redundant polygon points which redefine common shared lines segments between adjacent polygons, which results in a great savings of space in memory. This may also be used to store models having much greater resolution than conventional methods in the same memory space.

Usually memory space savings and computational complexity run opposite each other. In the present invention, you can have it both ways. The strip list requires less memory space in addition to allowing faster display of surfaces.

The strip list is displayed in the reverse manner from which it was created. Using the polygons of FIG. 2, an initial polygon is drawn (1,2,4). Subsequent vertices are drawn adding additional polygons, in the strip direction, to the previously drawn polygons. After the sublist is drawn, subsequent sublists (6,5,10,9) and (4,3,8,7) are drawn.

When using triangles as the polygons, two of the three vertices would be the same as the previously selected triangle resulting in the greatest time savings over other polygon choices. Therefore, only one vertex is required to define each additional polygon along the strip direction, as opposed to three. It can easily be seen that the savings (in both memory storage and display processing) is 2*N, where N is the number of triangles.

In an alternative embodiments, strip lists may be generated directly from a CAD/CAM systems, imaging systems, graphics workstations, or other imaging systems and stored without having to create, store and convert polygonal models.

In the graphics industry, there is a constant need for increased performance, and reduced memory requirements. Since, as stated above, they tend to be tradeoffs, it is a long-felt need to have a method which increases performance and reduces memory requirements. The simple method of the present invention, sacrifices little and makes great advances in the above mentioned areas.

While several presently preferred embodiments of the invention have, been described in detail herein, many modifications and variations will now become apparent to those skilled in the art. It is, therefore, to be understood that the appended claims are intended to cover all such modifications and variations as fall within the true spirit of the invention.

What we claim is:

1. A method of storing a set of polygons of a polygon model having a plurality of vertices in compact triangle strip lists comprising the steps of:

a) selecting an initial polygon of said polygonal model;

b) identifying said vertices of the initial polygon;

c) adding these vertices to the strip list;

d) selecting a strip direction;

e) selecting a polygon in the strip direction which has not yet been selected, that shares at least two of the vertices the previously selected polygon;

f) storing in the strip list, vertices of the selected polygon, other than vertices already stored in the strip list;

g) repeating steps "e"–"f" until all polygons in the strip direction have been selected; and h) repeating steps "a"–"g" for a plurality of different strip lists having different selected strip directions and initial polygons until all of polygons of a desired portion of said model has been selected.

2. A method of displaying a triangle strip list comprising the steps of:

a) reading an initial polygon, and strip direction from the strip list;

b) drawing the initial polygon;

c) reading subsequent vertices from the strip list d) drawing the vertices read from the strip list in the strip direction thereby adding to the strip;

e) repeating steps "c"–"d" for remaining vertices in the strip list to result in a rapidly displayed surface.

3. A method of identifying a surface comprising the steps of:

a) selecting an initial polygon having a plurality of vertices on said surface;

b) storing the vertices of the initial polygon in a strip list;

c) a strip direction;

d) selecting a polygon along the strip direction having a plurality of vertices on said surface and sharing at least two vertices of the previously computed polygon;

e) storing the, vertices of the computed polygon in the strip list, except for those already stored in the strip list; and f) repeating steps "d" length in the strip direction to result in a strip list identifying said surface; and g) repeating steps "a"–"f" for a plurality of different strip lists having different selected strip directions and initial polygons until all of polygons of a desired portion of said surface been selected.

4. The method of identifying a surface of claim 3 further comprising, after the step "f" the step of displaying the strip list as a surface.

5. The method of identifying a surface of claim 3 further comprising, after the step "f" the steps of:

a) reading an initial polygon from the strip list;

b) drawing the initial polygon;

c) reading subsequent vertices from the strip list d) drawing the vertices read from the strip list in the strip direction thereby adding to the strip;

e) repeating steps "c"–"d" for remaining vertices in the strip list to result in a rapidly displayed surface.

6. A graphics workstation for manipulating polygonal models comprising:
   a) a polygonal model memory for storing a set of polygons from the polygonal models;
   b) a polygon strip list memory for polygon strip lists;
   c) a strip generator for converting a set of polygons in said polygonal model memory into a plurality of variable length polygon strip lists each pertaining to a different selected direction and for storing the strip lists in the polygon strip list memory;
   d) a strip display circuit for reading the polygon strip lists and forming an image from the polygon strip list.

* * * * *